United States Patent

Mangafas et al.

Patent Number: 5,987,980
Date of Patent: Nov. 23, 1999

[54] IN SITU TIRE VALVE ASSEMBLY EMPLOYING SHORT VALVE ELEMENT AS ANTENNA

[76] Inventors: Nicholas Mangafas, 8 Canal Road., St Peters New South Wales 2044; Phillip Albert Cohen, 8 Adair Place., Killara New South Wales 2071, both of Australia

[21] Appl. No.: 08/913,287

[22] PCT Filed: Feb. 23, 1996

[86] PCT No.: PCT/AU96/00099

§ 371 Date: Aug. 25, 1997

§ 102(e) Date: Aug. 25, 1997

[87] PCT Pub. No.: WO96/26076

PCT Pub. Date: Aug. 29, 1996

[30] Foreign Application Priority Data

Feb. 23, 1995 [AU] Australia .................................. PN1337

[51] Int. Cl.[6] .................................................. B60C 23/04
[52] U.S. Cl. ...................... 73/146.8; 73/146.4; 340/447
[58] Field of Search ............................... 73/146.3, 146.4, 73/146.5, 146.8; 340/447, 451, 626

[56] References Cited

U.S. PATENT DOCUMENTS

| | | |
|---|---|---|
| 4,037,192 | 7/1977 | Cowit . |
| 4,074,227 | 2/1978 | Kalmus . |
| 4,308,520 | 12/1981 | Darlington . |
| 4,686,855 | 8/1987 | Smith ...................................... 73/146.8 |
| 4,998,092 | 3/1991 | Ohno et al. ......................... 73/146.8 X |

FOREIGN PATENT DOCUMENTS

| | | |
|---|---|---|
| 7350281 | 7/1981 | Australia . |
| 2915272 | 10/1980 | Germany . |
| 3150864 | 7/1982 | Germany . |
| 3931830 | 3/1990 | Germany . |
| 3930479 | 3/1991 | Germany . |
| 3930480 | 3/1991 | Germany . |
| 4242861 | 6/1994 | Germany . |
| 4303583 | 8/1994 | Germany . |
| 4303591 | 8/1994 | Germany . |
| 1359536 | 7/1974 | United Kingdom . |

Primary Examiner—Joseph L. Felber
Attorney, Agent, or Firm—Knobbe, Martens, Olson & Bear, LLP

[57] ABSTRACT

A tire valve element assembly comprises a pressure sensing and transponder arrangement. The arrangement is mounted on a short valve element so as to extend axially from the short valve element and is sized to slidably fit within and be removable from a valve stem of a tire. The tire valve element assembly is adapted to be connected via an electrically conducting receptacle within the stem, so as to be a direct substitution for an existing in situ valve element in the tire valve stem. The arrangement is in fluid contact with the interior of the tire to sense the pressure within the tire when the short valve element is in situ. The arrangement, when in situ, is electrically connected to a conductive portion of the valve element via the receptacle to facilitate an antenna system for radio frequency communication with the arrangement.

12 Claims, 10 Drawing Sheets

*Remote Station*

Fig. 9(a)

*Instrument Panel*

IN SITU TIRE VALVE ASSEMBLY EMPLOYING SHORT VALVE ELEMENT AS ANTENNA

TECHNICAL FIELD

The present invention relates to a vehicle tire pressure telemetry system, and more particularly to a tire pressure sensing transponder assembly for remote sensing and transmitting apparatus which is easily mounted to a vehicle tire and which will effectively transmit information regarding the pressure in the tire to which it is mounted, to a remote receiver device.

BACKGROUND OF THE INVENTION

A number of systems are known for providing tire pressure information to a driver of a vehicle. Typically, these are binary systems which only provide the driver with information as to whether the tire pressure is above or below a predetermined pressure.

One known system utilises a magnetic coupling across the tire wall between a pressure sensor within the tire and a data processing device outside the tire. This arrangement is awkward to install and can be unreliable.

Typically, such systems transmit the tire pressure information to the driver's cabin via connecting wires. This arrangement is disadvantageous since it is necessary to provide a means for maintaining electrical contact between the wiring outside of the tire, and the pressure sensing device mounted within the tire. Further, the installation of such systems can be expensive and time consuming.

While it would be desirable to use wireless transmitting means, to date there has not been a satisfactory system which is able to be powered effectively and to withstand the relatively harsh environment in and around a vehicle tire, and thus provide reliable and effective transmission of the data to the driver's cabin.

SUMMARY OF THE INVENTION

The present invention concerns the provision of a structural arrangement for a standard tire valve element which obviates the need to modify the tire, rim, wheel or valve stem receptacle, nor any need to remove or dismantle a tire or rim for its installation. Importantly, with the present invention the tire valve's air seal, safety and balance of the wheel and tire are not compromised.

In one aspect the present invention provides a tire valve element assembly comprising a pressure sensing and transponder arrangement, said arrangement being mounted on a short valve element so as to extend axially of the short valve element and being sized to slidably fit within and be removable from a valve stem of a tire whereby the valve element assembly is adapted to be threadedly connected via an electrically conducting receptacle within the stem, so as to be a direct substitution for an existing in situ valve element in the tire valve stem, and wherein the arrangement is in fluid contact with the interior of the tire to sense the pressure within the tire when the short valve element is in situ, characterised in that the arrangement, when in situ, is electrically connected to a conductive portion of the valve element via the receptacle to facilitate an antenna system for radio frequency communication with the arrangement.

In another aspect the present invention provides an assembly of an electronic pressure sensing means mounted on a short valve element of a pneumatic tire so as to, in use, sense pressure within the pressurized space of a tire said sensing means comprising;

processor means and wireless transmitting means mounted within a housing and connected to the sensing means for transmitting tire pressure information to a remote receiving device;

power storage means mounted within the housing for providing power to the transmitting means;

wherein the housing is fixedly mounted to an inner end of the short valve element so as not to interfere with the normal operation of the tire valve such that the longitudinal axis of the housing is generally aligned with the central axis of the tire valve, when in situ, and dimensioned so as to be slidably insertable into a standard valve stem of the tire with the short valve element threadedly connected to an electrically conducting receptacle in the stem and wherein, in use, the housing is located within the pressurized space of the tire such that the assembly is adapted to be a direct substitute for an existing in situ valve element in the tire valve stem; characterized in that the transmitting means, when in situ, is electrically connected to a portion of the tire valve element that extends outside of the pressure space of the tire and acts as an aerial for transmitting the information to the remote receiving device.

By means of the present invention it becomes readily possible to retrofit existing vehicle tires with short valve element transponder assemblies which include the dual function of a tire valve through which a tire is inflated or deflated without requiring any complex fitting of specialised components.

Preferably a transponder assembly of the invention is a passive device which is hermetically sealed in a housing designed to tolerate harsh environmental conditions. Desirably, necessary electronic functions, except the antenna are accommodated on a small micro-electronic chip measuring about one square millimeter. It is also advantageous to use a non-ferrous valve stem to facilitate ease of interrogation of the transponder.

In one embodiment a tire valve interrogator energises the tire valve transponders by means of an electromagnetic field which is emitted by antennae brought to within one meter of each tire position being monitored. The interrogator then receives the coded pressure value signal and processes it for display and alarm conditions. Contactless communication between tire valve transponder and interrogator can occur inductively by means of a low power, polarised, low-frequency magnetic field. Five or more antennae could be polled by a multiplexer in order to activate relevant transponders so that they may sequentially transmit tire pressure information.

Installation of the interrogator and tire status display module in a vehicle's instrument display area involves connection to the vehicle's battery power via the ignition wiring harness, and extending and affixing antennae wires to within one meter of each tire position, including the spare tire.

A further embodiment of the assembly comprises an absolute pressure switch which closes its contacts when the tire pressure falls below the factory setting of, say, 25 psi. In this case the transponders and transmit/receiving antennae will be disabled and the interrogator will report a fault condition in the absence of a reply from the transponder. Any absence of reply, for example in the case of a faulty transponder, will be reported as a tire fault condition.

In a still further embodiment the assembly comprises an absolute pressure sensor having a piezo electric transducer to modulate the transmitter signal for reception and decoding by an interrogator as actual pressure displayed at the driver's console display.

A still further embodiment of the invention, designed to obviate installation of multiple excitation/sensor aerials to the tire proximity, provides an electronic pressure sensing means mounted on a short valve element so as to, in use, sense pressure within the pressurized space of the tire;

a processor means and a wireless transmitting means mounted within the housing and connected to the sensing means for transmitting tire pressure information to the remote receiving device;

a power storage means mounted within the housing for providing power to the transmitting means;

wherein the housing is fixedly mounted to an inner end of a tire valve so as not to interfere with the normal operation of the tire valve such that the longitudinal axis of the housing is generally aligned with the cental axis of the tire valve so that the apparatus is adapted to be inserted into and mounted on a standard valve fitting of the tire and wherein, in use, the housing is located within the pressurised space of the tire; and wherein the transmitting means is connected to a portion of the tire valve so that, in use, the portion extends outside of the pressure space of the tire and acts as an aerial for transmitting the information to the remote receiving device.

Preferably, the housing contains at least the processor means, transmitting means and power storage means, and is generally elongate.

Preferably, the pressure sensing means is in the form of an absolute pressure transducer which produces a low level output voltage proportional to the pressure in the pressurised space of the tire, which output voltage is received by the processor means to be converted into coded data which in turn is transmitted by an FM transmitter module defining the transmitting means.

The present invention also relates to a tire pressure telemetry system comprising sensing and transmitting apparatus and a remote receiving device which receives and processes the coded data and selectively displays the actual sensed tire pressure of a tire of the vehicle.

Preferably, the system comprises a plurality of sensing and transmitting apparatus each mounted to a respective tire of the vehicle, with the remote receiving device being adapted to distinguish between the coded signals received from the respective apparatus, which coded signals are unique to the system as compared to any signals transmitted from the apparatus of another system.

In embodiments where the or each apparatus has a power generating means for recharging the power storage means, the generating means may comprise a piezo bi-morph element which is mounted to the housing and which, in use, converts mechanical energy of vibration to electrical energy, and a rectifying and regulating means which is connected to the bi-morph element and which operates on the electrical energy and delivers the electrical energy via a trickle charger to the power storage means.

It will be appreciated that the sensing and transmitting apparatus can be easily installed onto the tire of a vehicle by simply replacing the standard valve of the tire with the sensing and transmitting apparatus. Further, the novel arrangement of the transmitter means utilising the metallic valve as the aerial for data transmission allows the apparatus to function reliably and effectively so that the driver of the vehicle can always know the actual pressure or a "go/no go" pressure in each tire of the vehicle.

Furthermore, the use of a piezo bi-morph element being to generate electrical power from the vibration of the vehicle tire when the vehicle is in operation, and trickle charging the electrical storage means (ie. battery), allows the apparatus to be self-contained and to remain operative for a far longer time.

BRIEF DESCRIPTION OF THE DRAWINGS

Embodiments of the present invention will now be described by way of example with reference to the accompanying drawings, wherein.

BEST MODES

Figure 1:
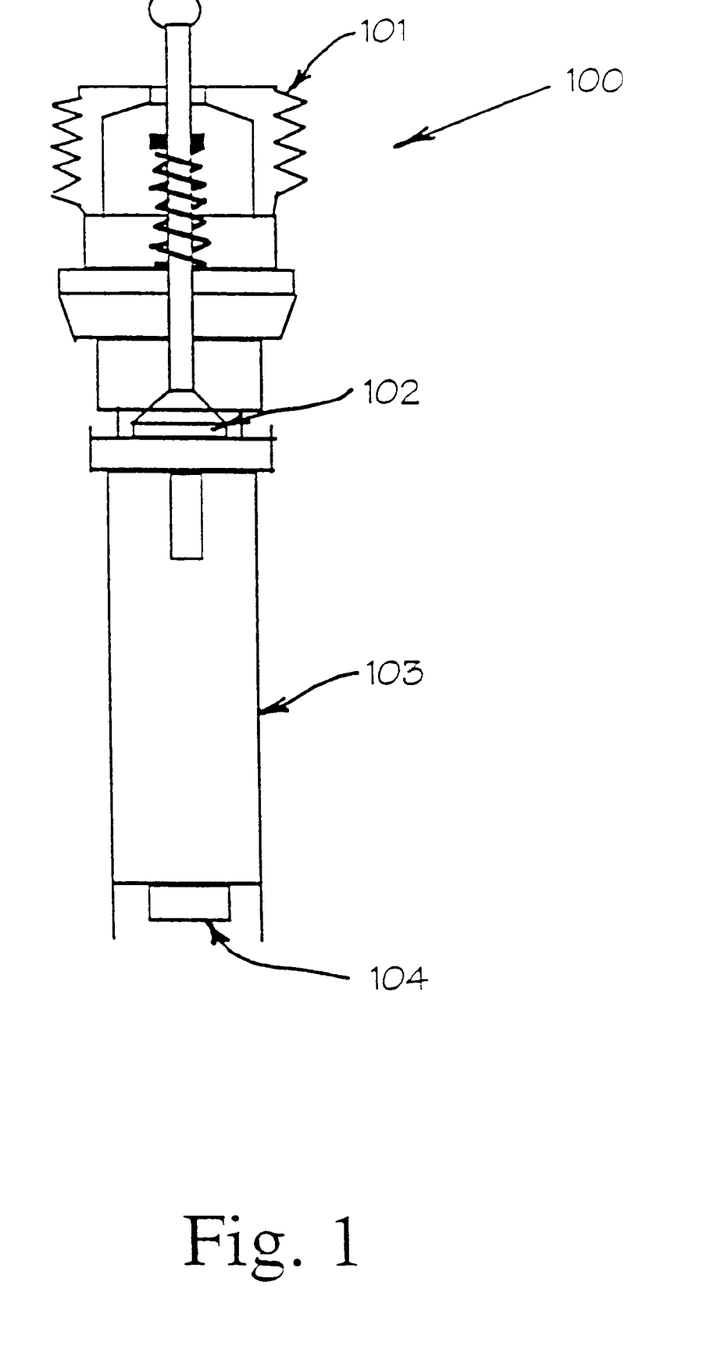
FIG. 1 is a schematic longitudinal section view of a first embodiment of a short valve assembly in accord with the present invention.

The embodiment of FIG. 1 comprises a standard short valve assembly 100 having a threaded connection 101 for fitting the valve assembly into a metallic receptacle of a standard valve stem on a pneumatic tire. The base of valve closure member 102 is bonded to a surface acoustic wave transponder 103 which is electrically coupled to a pressure sensor 104 which could typically be a piezo electric transducer or an absolute pressure switch.

In operation, an existing standard short valve assembly in a pneumatic tire can be replaced by the arrangement shown in FIG. 1 merely by unscrewing the existing valve assembly from its valve stem and screwing in the transponder assembly of FIG. 1 and then inflating the tire in the normal manner.

Figure 2:
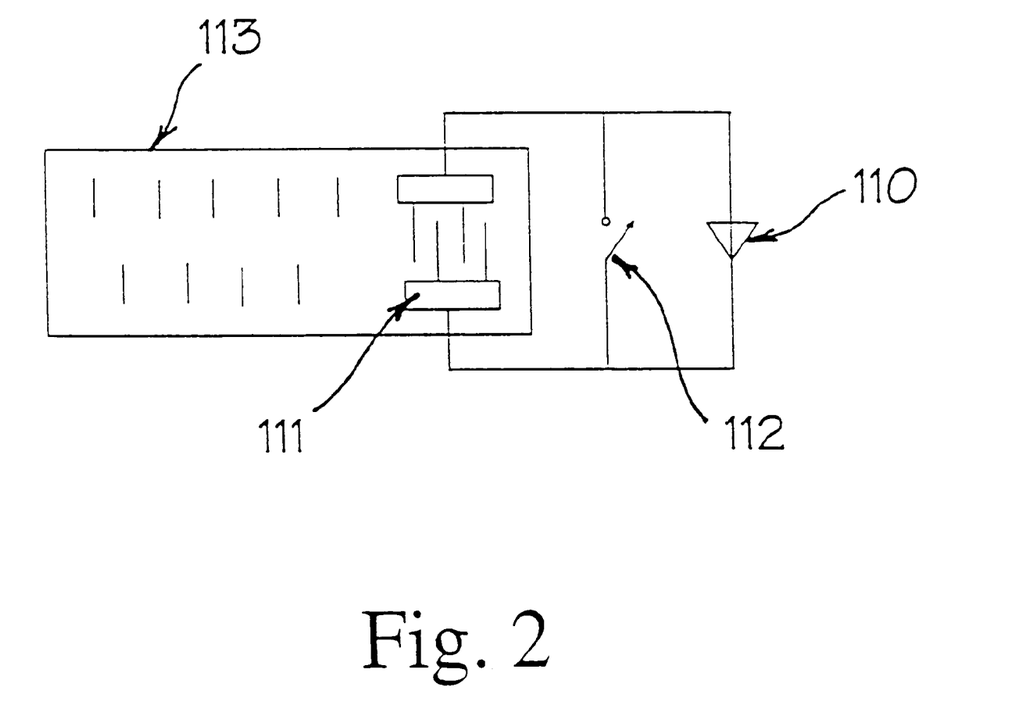
FIG. 2 is a schematic circuit diagram of a surface acoustic wave transponder, showing how a pressure switch may disable/transmit via an antenna suitable for use in the embodiment of FIG. 1.
Figure 3:
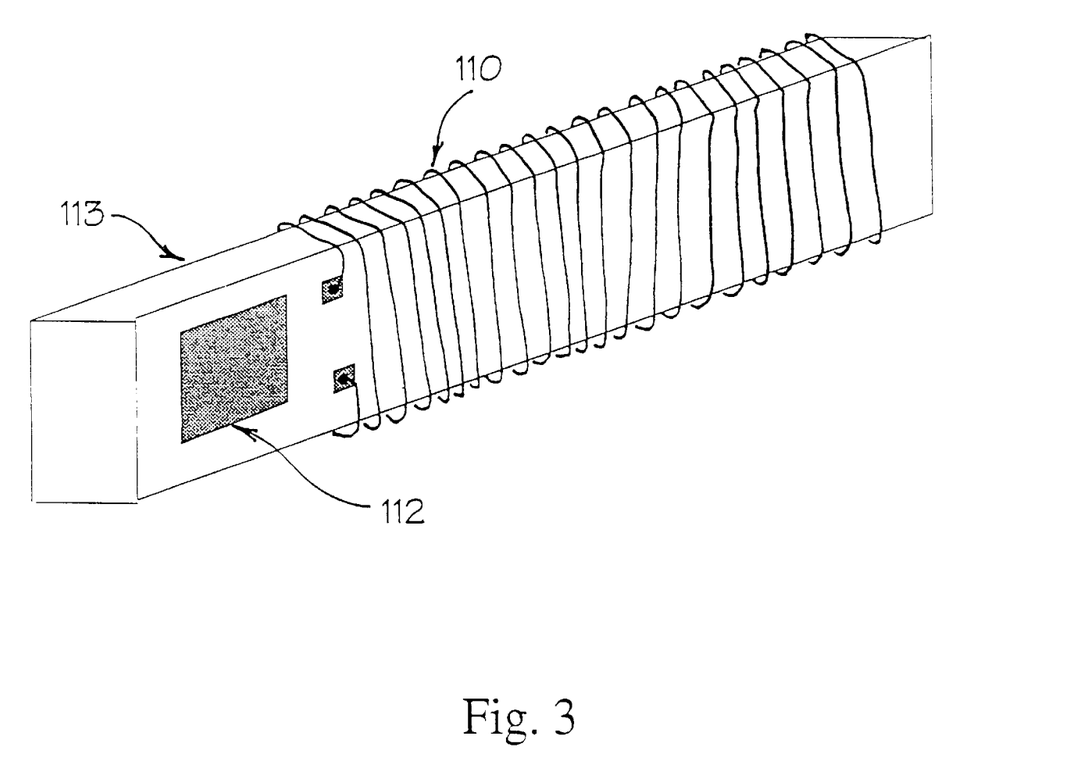
FIG. 3 is a perspective view of an example of a transponder arrangement of a surface acoustic wave device for use in the embodiment of FIG. 1.

The circuit diagram of FIG. 2 and its representation as a device in FIG. 3 comprises an antenna 110 which is coupled to a launch transducer 111 with an absolute pressure switch 112 in parallel. Silicon substrate wafer 113 incorporates address code reflectors and a piezo-electric substrate. The functioning of surface acoustic wave transponders is well understood by a person skilled in the art and need not be further elaborated here.

Figure 4:
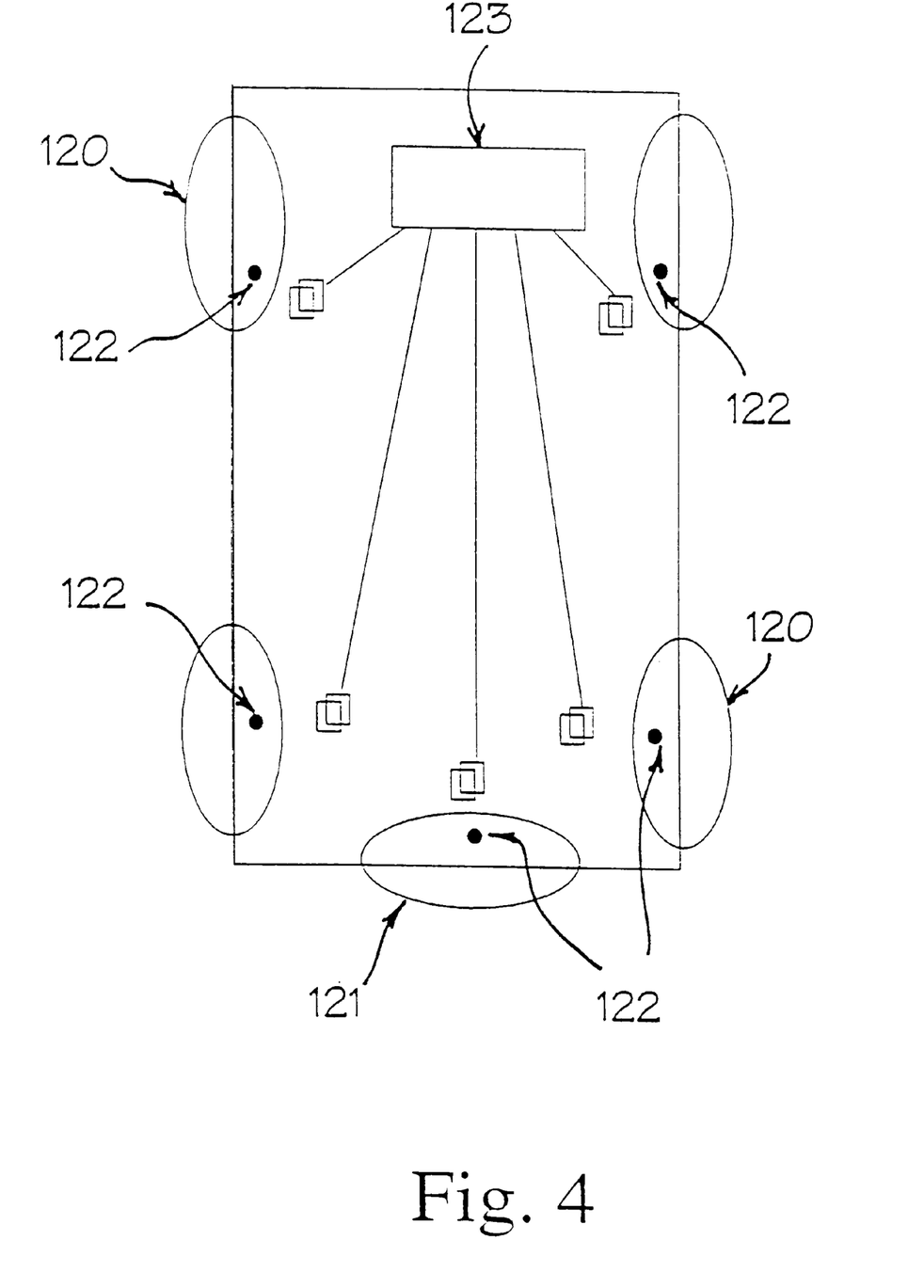
FIG. 4 is a schematic arrangement of a vehicle illustrating a passive transponder configuration for use of the present invention.
Figure 6:
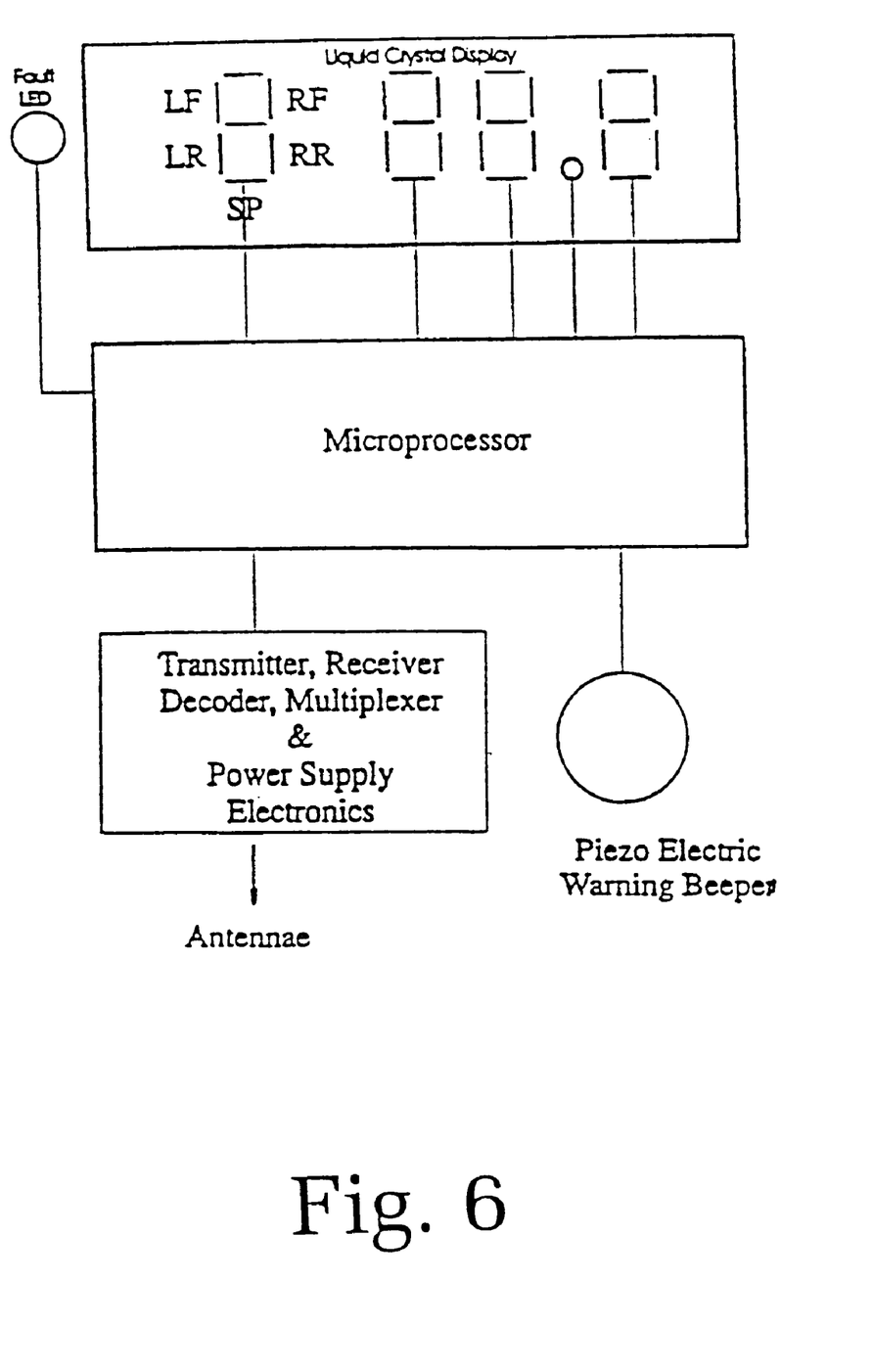
FIG. 6 is a schematic arrangement indicating a method of displaying tire pressure.

The layout of FIG. 4 schematically shows a vehicle having four road engaging wheels 120 and a spare tire 121 whereby pressure transponders 122 in accord with the present invention are interrogated by interrogation and display means 123 which enables the internal tire pressure of each of the tires to be detected and displayed within a vehicle by means as exemplified in FIG. 6.

The schematic of FIG. 6 functions by receiving a radio frequency signal through the antennae to the receiver. The received signal is decoded before being fed to the microprocessor. The received signal is generated as a result of an interrogation signal sent via transmitter to selective ones of the short valve assemblies (FIG. 1) of the invention in situ in tires of a vehicle. The microprocessor analyzes the decoded signal to display via a "fault" LED and/or audibly at the beeper and on the display panel which shows the tire (LF=left front) and the quantum of the pressure in the tire via the liquid crystal display.

Figure 5:
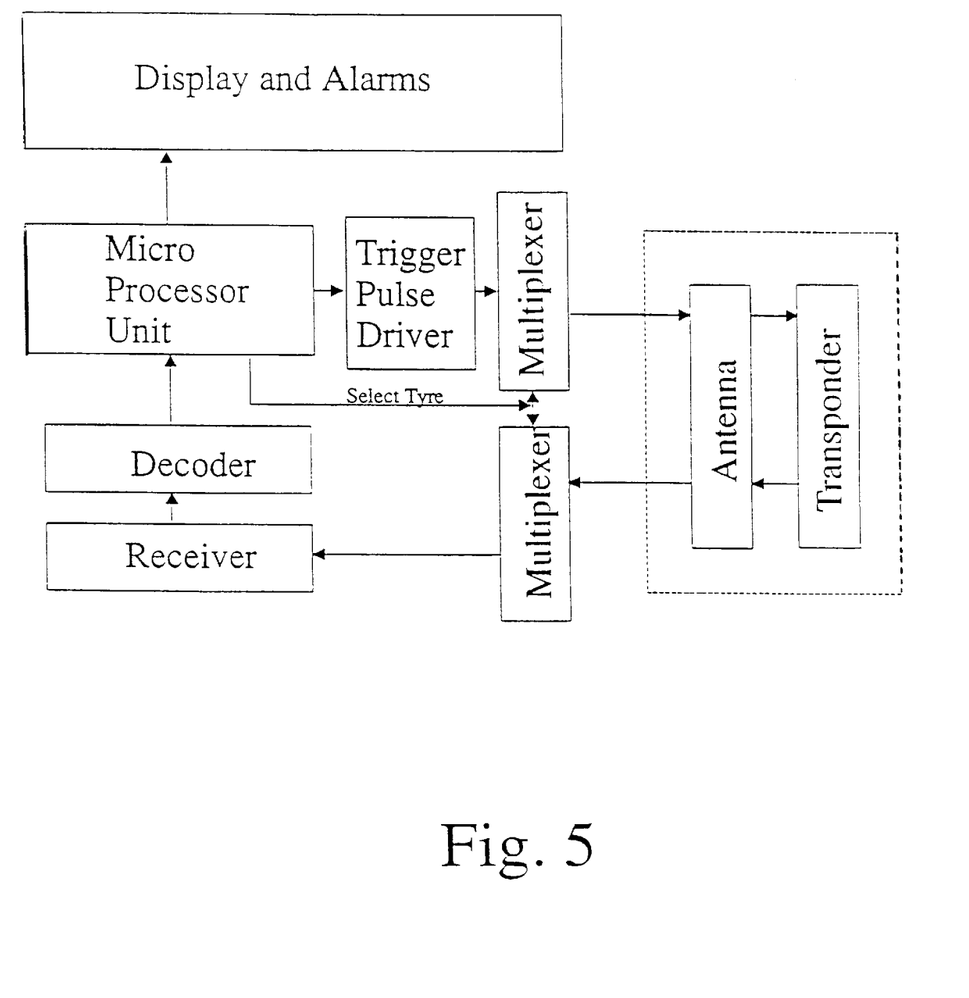
FIG. 5 is a block diagram of an operating system employing the components FIGS. 1, 2, 3 and 4.

The block diagram of FIG. 5 shows the interaction between the components of a tire pressure telemetry system adapted to employ a short valve assembly pressure transponder in accord with the present invention.

Figure 7:
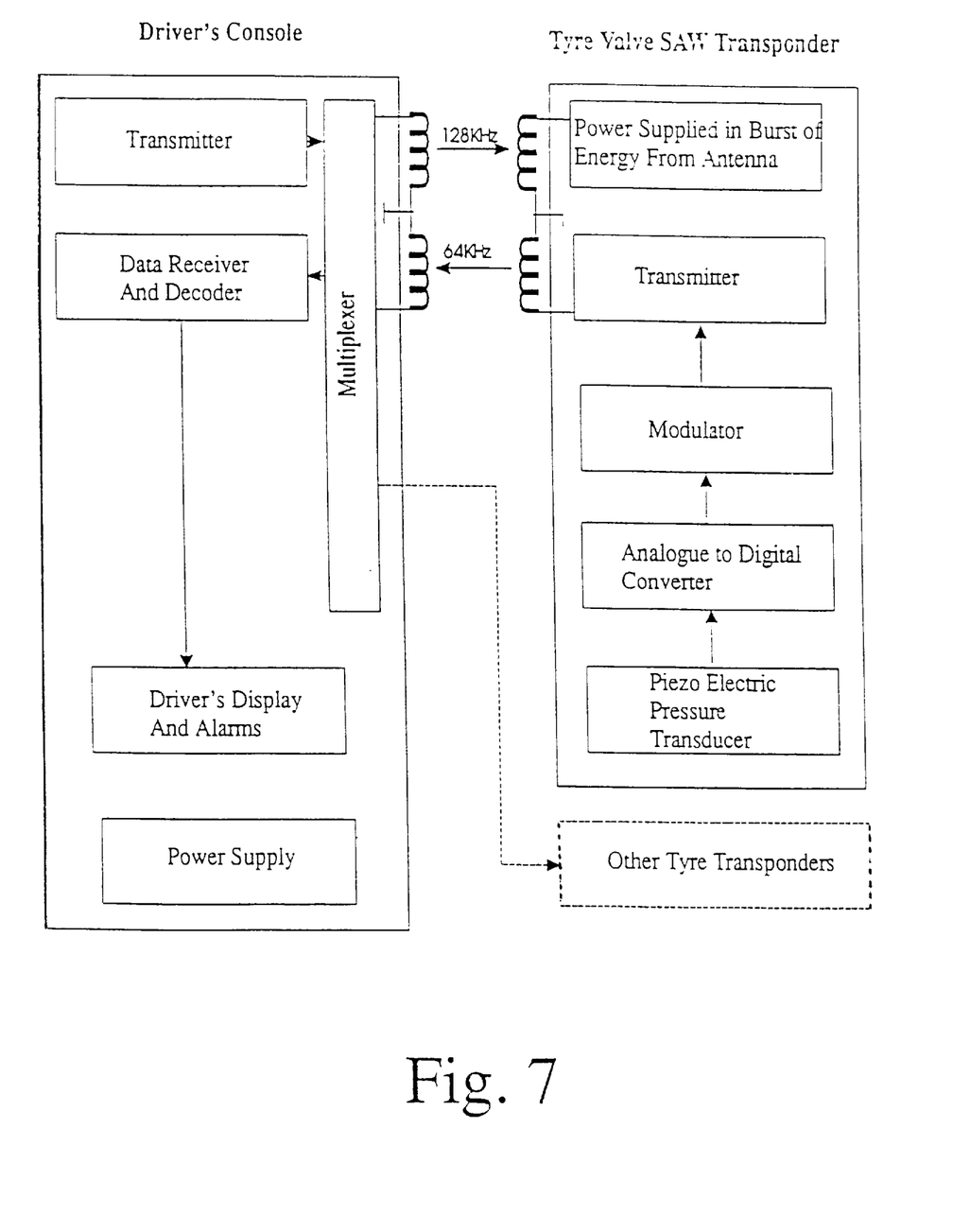
FIG. 7 is a block diagram of a passive transponder (no local power source) and interrogator arrangement suitable for use with the first embodiment of the present invention.

The block diagram of FIG. 7 displays the mode of operation and contactless communication between a transponder in accord with the present invention and a display system whereby the pressure detected by a plurality of transponders can be separately polled for display.

Figure 8:
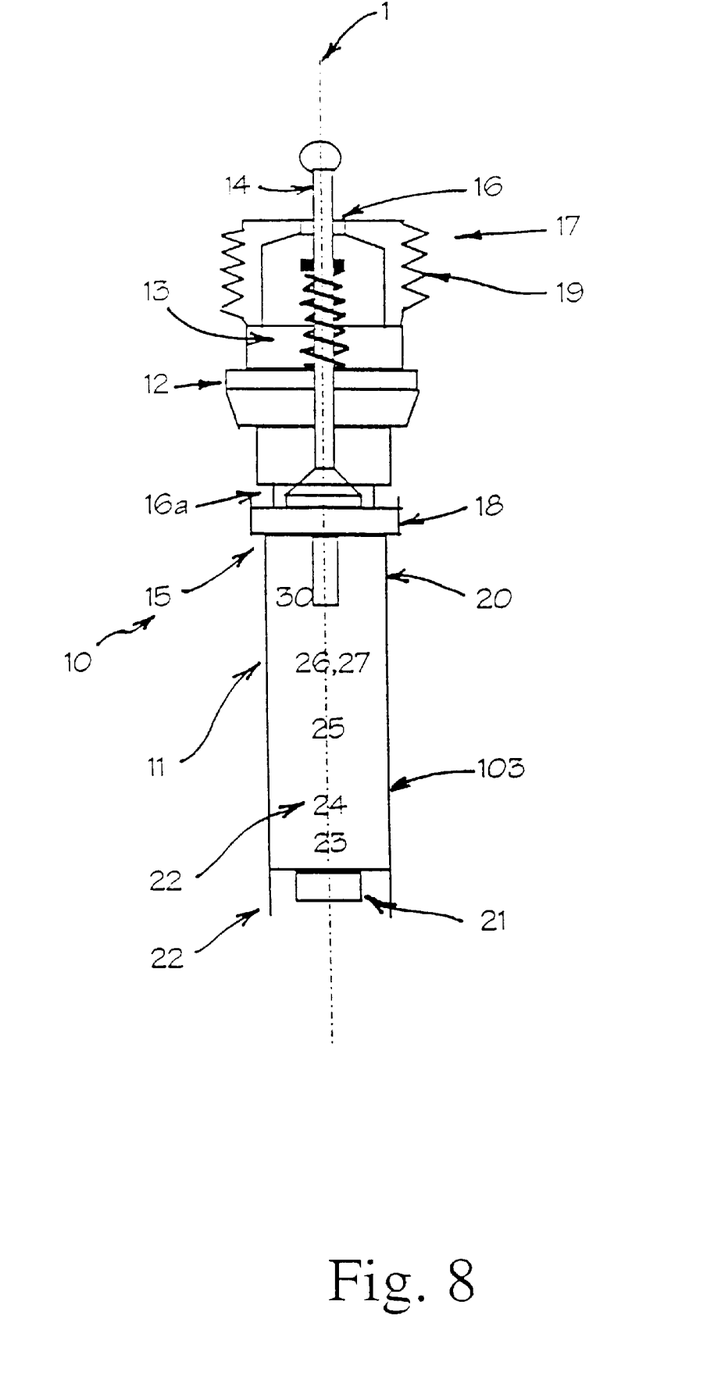
FIG. 8 is a schematic longitudinal sectional view of another embodiment of the present invention, being an active/powered transponder assembly.

Referring to FIG. 8, there is shown a sensing and transmitting apparatus 10 having a housing 11 fixedly mounted to a standard metallic tire valve 12.

The valve 12 includes a metal body 13 and an elongate valve pin or plunger 14 slidably received within the body 13. In the open position of the valve 12, an air passage 16 extends through the body 13 generally parallel to the central axis 1 of the valve 12 generally around the plunger 14. Near the inner end 15, a radially extending annular recess 16a provides fluid communication between the inside of the tire and the passage 16 which is open at the outer end 17 of the valve 12.

The inner end 15 of the valve 12 is defined by an end flange 18 which moves with the plunger 14, and to which the housing 11 is affixed.

The housing 11 is generally elongate and, at one end 20a, is fixed to the inner end 15 of the valve 12. The housing has dimensions in a direction normal to its longitudinal axis 1 which are less than that of a threaded portion 19 of the valve 12 (i.e. which is threadably engaged with an internal threaded portion (not shown) of the standard valve receptacle) so that the apparatus 10 can be received in the standard valve receptacle (not shown) of a standard tire and thereby be exposed to the pressure within the tire.

Figure 9A:
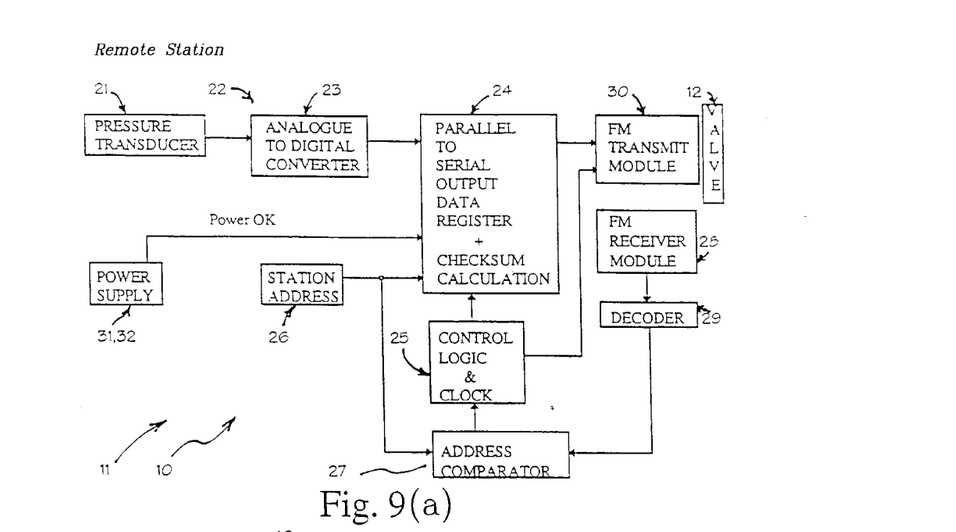
FIGS. 9(a) and 9(b) are a schematic block diagrams showing the components of the system of the embodiment of FIG. 8.

Referring to FIG. 9a, an absolute pressure transducer 21 is mounted to the other end 20b of the housing 11 so that, in use, it is exposed to the pressure in the pressurised space of the tire. In use, variations in the pressure applied to the diaphragm (not shown) of the transducer 21, causes it to flex thereby changing its resistance. This results in the transducer 21 delivering a low level output voltage which is proportional to the pressure within the pressurised space of the tire.

The transducer 21 is connected to and delivers the low level output voltage to a processing apparatus 22 which includes an analog to digital converter 23, a parallel to serial output data register (including check-sum calculation) 24 and a control logic (with clock) 25.

The processing apparatus 22 also has a station address 26 and address comparator 27 which compares any signal which is received by an FM receiver module 28 and decoded in decoder 29, with a signal of the station address 26. In this way, the apparatus 6 can receive a signal and confirm that the signal is intended for that apparatus 10 before passing the decoded signal to the control logic 25.

The output data register 24 and control logic 25 both deliver coded data to an FM transmit module 30 which transmits this information to the remote receiver device 40 using a predetermined FM frequency.

There is also a power supply in the form of a nickel-cadmium (rechargeable) button cell 31 which provides the required electrical power to operate the sensing and transmitting apparatus 10.

Significantly, the FM transmit module 30 is electrically connected to the valve 12 so that the valve 12 serves as an aerial for the FM signal transmission (and reception).

This arrangement is particularly advantageous since it allows the relevant parts of the sensing and transmitting apparatus 10 to be securely mounted to the tire so as to be exposed to the tire pressure, and for the aerial of the apparatus 10 to be outside of the tire without the need for awkward connections through the tire wall and without interfering with the normal operation of the valve 12 in relation to its primary task of allowing the tire to be inflated and for controlling the inflation pressure within the tire.

Figure 10:
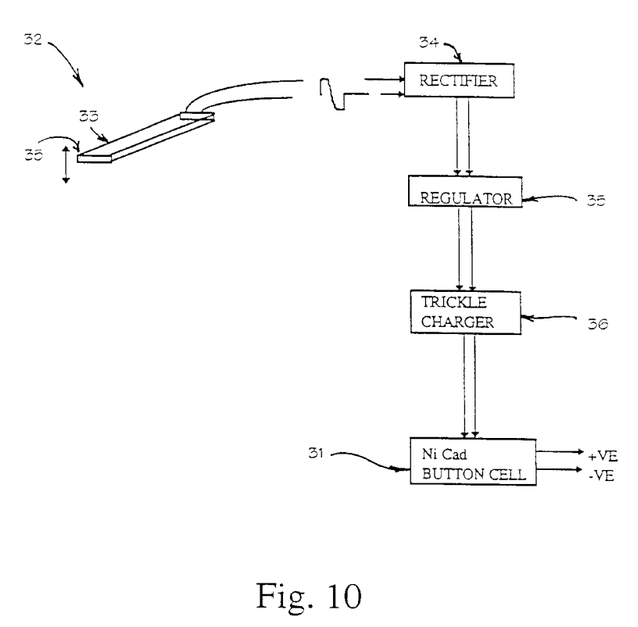
FIG. 10 is a schematic diagram of the features of the bi-morph generator suitable for use in the embodiment of FIGS. 8 and 9(a) and 9(b).

The sensing and transmitting apparatus 10 also includes a recharging means 32 for automatically recharging the power cell 31. The recharging means 32 comprises a piezo ceramic bi-morph element 33 which is generally elongate and is fixably attached at one end 35 to the housing 11, with its other end 35 being free to pivot in a cantilever action under the influence of vibrations created while the tire is rotating.

Typical Bi-Morph Characteristics:

| | |
|---|---|
| Capacitance | 750 pF |
| Dielectric Constant | 2000 |
| Piezo Constant $-9^{31}$ ($\times 10^{-3}$ V-m/N) | 12:1 |
| Electromechanical coupling Factor | 60 |
| Compliance ($\times 10^{-4}$ m/N) | 6.6 |
| Max Stress | 50–100 $\mu$m |
| Output @ 10 $\mu$m P—P | 4 V P—P |
| Impedance | 1M OHM |

The element 33 is able to convert this mechanical energy of vibration into electrical energy which is delivered to a rectifier 34 and regulator 37 respectively, and then via a trickle charger 36 to the cell 31. In this way, the vibrations exerted on the apparatus 10 during use are converted into useful electrical power to maintain the charge in the cell 31 and allow the apparatus 10 to remain in service for a far longer period of time. In the event that the battery condition is poor, the available power is low, or if there is a malfunction in the apparatus 10, the receiver device 40 will set off an alarm to warn the driver.

Figure 9B:
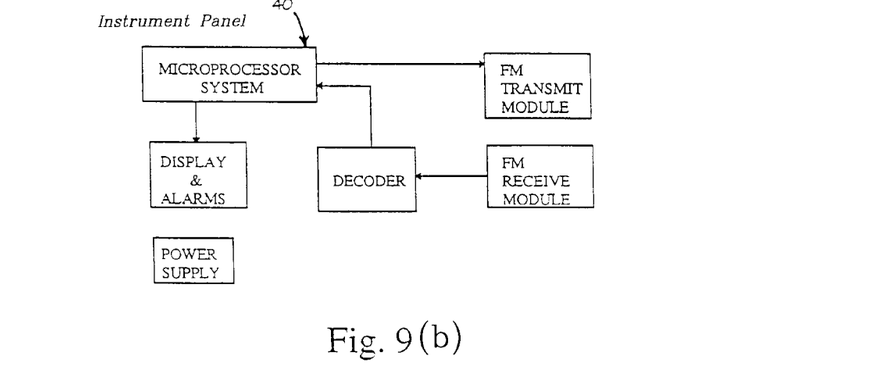

Referring to FIG. 9b, there is shown a schematic block diagram of the remote receiver device 40 which is to be mounted in a convenient position such as within the driver's cabin of the vehicle (not shown). The receiver device 40 includes an FM receive module 41 which receives signals from one or more of the sensing and transmitting apparatus 10, a decoder 42 which decodes the coded FM signal and delivers the decoded signal to a microprocessor 43.

The microprocessor 43 is able to distinguish between the various decoded signals received from the sensing and transmitting apparatus 10 mounted to the respective tires of that vehicle, and is also able to distinguish these signals from any other signals received from the sensing and transmitting apparatus of another vehicle's system.

The microprocessor 43 operates on the relevant signals and delivers the tire pressure information to a display device 44 which can selectively display the actual tire pressure in any one of the tires of that vehicle, and which will be caused to generate an alarm if any of the tires have pressures outside a predetermined range.

The receiver device 40 also includes its own FM transmit module 43 to send signals to the respective sensing and transmitting apparatus 10 each of which, as mentioned above, have an FM receiver module 28 and decoder 29.

The tire pressure telemetry system 50 which includes one or more of the sensing and transmitting apparatus 10 and the remote receiving device 40 is easy to install since all that is required is for the standard valves of a vehicle's tires to be replaced by respective sensing and transmitting apparatus 10, with the housing 11 being received through the standard valve receptacle of the tire which receives the valve, and the valve 12 of the apparatus 10 being mounted in the normal way to the tire receptacle. Further, the remote receiver apparatus 40 can be conveniently installed in the driver's cabin.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:

1. A tire valve element assembly comprising a pressure sensing and transponder arrangement, said arrangement being mounted on a short valve element so as to extend axially from the short valve element and being sized to slidably fit within and be removable from a valve stem of a tire whereby the tire valve element assembly is adapted to be threadedly connected via an electrically conducting receptacle within the stem, so as to be a direct substitution for an existing in situ valve element in the tire valve stem, and wherein the arrangement is in fluid contact with the interior of the tire to sense the pressure within the tire when the short valve element is in situ, characterized in that the arrangement, when in situ, is electrically connected to a conductive portion of the valve element via the receptacle to facilitate an antenna system for radio frequency communication with the arrangement.

2. An assembly as claimed in claim 1 wherein the arrangement is mounted on the innermost end of a valve plunger of the short valve element.

3. An assembly as claimed in claim 1 or 2 wherein a valve pin or plunger of the short valve element, when in electrical contact with the receptacle, functions as the antenna for the transfer of data from the arrangement.

4. An assembly as claimed in claim 1 or 2 wherein the pressure measured by the transponder is adapted to be accessed by contactless communication means.

5. An assembly as claimed in claim 1 or 2 wherein the pressure measured by the arrangement is compared with a predetermined pressure value.

6. An assembly as claimed in claim 1 wherein the pressure measured by the arrangement is an absolute pressure.

7. An assembly as claimed in claim 6 wherein the arrangement in fluid contact with the interior of the tire to sense the pressure has a piezo-electric transducer to modulate a transmitter signal for reception and decoding by an interrogation.

8. An assembly as claimed in claim 1 wherein the transponder uses a passive electrical device.

9. An assembly as claimed in claim 1 wherein the transponder is an active electrical device.

10. An assembly of an electronic pressure sensing means mounted on a short valve element of a pneumatic tire so as to, in use, sense pressure within the pressurized space of a tire, said sensing mean comprising:

processor means and a wireless transmitting means mounted within a housing and connected to the sensing means for transmitting tire pressure information to a remote receiving device;

power storage means mounted within the housing for providing power to the transmitting means;

wherein the housing is fixedly mounted to an inner end of the short valve element so as not to interfere with the normal operation of the tire valve such that the longitudinal axis of the housing is generally aligned with the central axis of the tire valve, when in situ, and dimensioned so as to be slidably insertable into a standard valve stem of the tire with the short valve element threadedly connected to an electrically conducting receptacle in the stem and wherein, in use, the housing is located within the pressurized space of the tire such that the assembly is adapted to be a direct substitute for an existing in situ valve element in the tire valve stem; characterized in that the transmitting means, when in use, is electrically connected to a portion of the tire valve element that extends outside of the pressure space of the tire and acts as an antenna for transmitting the information to the remote receiving device.

11. An assembly as claimed in claim 10 wherein the housing is affixed to an inner end of a valve plunger of the short valve element.

12. An assembly as claimed in claim 11 wherein a valve pin of the valve plunger functions as the antenna for the transmitting means.

* * * * *